United States Patent Office 3,265,632
Patented August 9, 1966

3,265,632
AQUEOUS THERMALLY REVERSIBLE RIGID
SODIUM HYDROXIDE GEL AND PROCESS
FOR PREPARING SAME
Harry W. Leach, Chicago, Ill., assignor to Corn Products Company, New York, N.Y., a corporation of Delaware
No Drawing. Filed Apr. 9, 1963, Ser. No. 271,587
6 Claims. (Cl. 252—316)

This invention relates to the formation of a rigid gel from concentrated sodium hydroxide solutions by dissolving therein small amounts of amylose, i.e., the linear-chain fraction of starches.

More particularly, the present invention relates to the discovery that a strong gel-like structure is obtained with an aqueous sodium hydroxide solution between about 4 and about 9 normal concentration, by dissolving therein an amount of amylose in excess of about 0.1% dry basis, calculated on a weight per volume basis for the final gel. The process of dissolving the amylose and forming the gel may be effected by various methods. For example, the required amount of amylose may be added to a concentrated aqueous sodium hydroxide solution between about 4 and about 9 normal, the mixture heated sufficiently to effect substantially complete solution of the amylose, and this solution then cooled to effect congelation. In another method, the required amount of amylose may be dissolved either in water or in a cold aqueous sodium hydroxide solution having a concentration of less than 4 normal, and additional sodium hydroxide thereafter added, either as a solid or as a very concentrated solution, to give a final concentration between about 4 and about 9 normal.

Thus, in the three-component system of amylose-sodium hydroxide-water, it has been discovered that a gel will be formed if the following requirements are met: (1) the amount of dry-basis amylose in the final gel must be at least 0.1%, calculated on a weight per volume basis; (2) the amylose must initially be in a dissolved state prior to formation of the gel; (3) the concentration of sodium hydroxide in the final gel system must be in the range of about 4 to about 9 normal. The techniques for preparing such a congealed sodium hydroxide system will be fully described subsequently in the specification and particularly in the examples.

The gel of the present invention is transparent and colorless and has much the same rigidity and elasticity as a common gelatin gel. The gel is thermally reversible, and can be repeatedly liquefied and re-gelled by alternately heating and cooling. The temperature at which liquefaction occurs depends upon the degree and interrelationship of the aforementioned conditions, i.e. amylose concentration and sodium hydroxide concentration. As these factors increase, either singly or in combination, the temperature required for liquefaction increases. In general, a gel herein described can be liquefied by heating to 50–70° C. A weaker gel, i.e. wherein the concentrations of amylose and/or sodium hydroxide approach minimal amounts, may show a thixotropic effect in which the gel may be liquefied at room temperature by vigorous agitation and will subsequently re-gel when allowed to stand. A stronger gel, formed at higher concentrations of amylose and/or sodium hydroxide, is a true stable gel having substantially no thixotropic properties and showing substantially no signs of liquefying under shear.

The proportion of amylose required for a satisfactory gel at a given sodium hydroxide concentration depends upon the purity of the amylose, particularly with respect to the presence of amylopectin. For instance, as shown below in Example I and III, only 0.1% of amylose having an iodine affinity of 20.2% was required at 5.0 normal sodium hydroxide concentration to form a rigid gel immediately. In constrast, 0.1% of amylose having an iodine affinity of 14.8% would not produce a gel even at 8.2 normal sodium hydroxide concentration but upon raising the proportion of lower iodine affinity amylose to 0.5% a satisfactory rigid gel was formed.

It has been further discovered that this gel formation is apparently characteristic only of a sodium hydroxide system. This surprising fact is illustrated hereinafter wherein it is shown that no gel formation is obtained with other alkali metal hydroxides, such as potassium hydroxide and lithium hydroxide. The difference in behavior of the various alkali metal hydroxides may perhaps be attributed to ionic activity and the proportion of free versus bound water in these concentrated solutions; however, no evidence substantiating this theory can be offered.

Furthermore, it has been observed that the sodium hydroxide-amylose gel of the present invention is particularly unique and unexpected, since dilute sodium hydroxide solutions of less than about 4 normal have commonly been used as a solvent for starch and amylose to provide thin non-congealing solutions. For example, 0.5 normal and 1.0 normal sodium or potassium hydroxide solutions have been traditionally employed for the determination of intrinsic viscosity of starches and amyloses by capillary viscometry ("Methods in Enzymology," edited by Colowick and Kaplan, Academic Press, 1957, volume 3, pages 15–17). These low normality solutions, when used as solvents for starch and amylose, result in thin solutions in which the molecules are molecularly dispersed and dissociated. Similarly, 0.9% sodium hydroxide solution has been employed in the starch industry as the solvent medium for the measurement of the Buel alkali fluidity of starches (8th Intern. Congs. Pure Applied Chem., Orig. Com., 13, 63 (1912)). This latter method requires that the starch dispersion in dilute alkali be sufficiently fluid to pass through an orifice viscometer. As another example, suppliers of commercial amyloses (which are partially water-insoluble because of retrogradation) recommend solution of these materials by stirring in cold dilute (3%) sodium hydroxide solution. As still another example, sodium hydroxide solutions of much lower concentration than used in the present invention have been commonly employed to dissolve or liquefy starches and amylose for such reactions as alkylation and hydroxalkylation, without any evidence of gel formation. To be sure, high concentrations (e.g. 5–20%) of unmodified starch will gelatinize in 1 normal sodium hydroxide solution to give a plastic dough, but this is very unlike the rigid elastic gels herein described, and moreover such doughs are irreversibly liquefied by standing or by heating or by agitation. Hence the formation of a true rigid reversible gel under the unique circumstances herein described represents a radical departure from the previous usage of sodium hydroxide to give fluid non-congealing dispersions or solutions of starches and amyloses.

There are many possible uses for a sodium hydroxide-amylose gel as described herein. A few of these uses which are merely illustrative are:

(1) As a convenient and safe method for shipping and handling concentrated caustic soda solutions. Such a product could be readily cut with a shovel or metal paddle, and would avoid both the harmful dust of flake caustic and the splash of liquid caustic solutions.

(2) As a surface detergent or etching agent, whereby the gel would be warmed sufficiently to cause liquefaction, and this fluid then sprayed or painted on the cool surface to be treated. Contact with the cool surface would cause congelation, thereby preventing drainage of the caustic agent. Such a system would be particularly effective for the removal of paint from metal surfaces.

(3) As an electrolytic gel for electrical storage batteries, plating systems and similar applications requiring high alkalinity.

(4) As a means for effecting local mercerization of cottons and similar fabrics. For example, cotton seersucker might be "printed" with the heat-liquefied gel; immediate congelation would limit the shrinking action to the area so printed, thus preventing extensive wicking of sodium hydroxide through the cotton fabric.

(5) As a jelly for zone-chromatographing of alkali-soluble materials.

Suitable amyloses or linear starch materials for use in the present invention include the linear potato starch fraction obtained in accordance with the procedures of U.S. Patents No. 2,829,987 to No. 2,829,990, a linear corn (maize) starch fraction obtained in accordance with the process described in U.S. Patent No. 3,067,067, genetic varieties of corn starch having a high amylose content, and starches from various types of wrinkled-seeded garden peas having amylose contents of 50–75%, e.g., the variety known as "Laxton's Progress." The amylose fractions of other starches such as wheat, tapioca, and the like are also satisfactory.

In general, congelation of a sodium hydroxide solution requires use of the linear starch material as the gelling agent. The presence of the branched amylopectin fraction appears to impede the development of a gel by the linear fraction. For example, if 1% of ordinary unmodified corn (maize) starch (which contains 28% of the amylose fraction) is dissolved in sodium hydroxide solutions of 4–9 normal concentration, only a weak semi-fluid gel is produced, despite the fact that the actual amylose present (i.e. 0.28%) is sufficient to produce a satisfactory gel in the absence of amylopectin. Hence it is preferable to use an amylose material containing substantially no amylopectin.

Amylose can be prepared in several ways, for example, by fractionating corn, potato, or other starches with butyl or amyl alcohol, and subsequently drying under conditions to yield a non-retrograded product which is completely soluble in boiling water (see the Journal of the American Chemical Society, volume 71, pages 4066–4067 (1949)). In one embodiment of the present invention, amylose (prepared by the above-cited method) is dissolved in boiling water. After the solution is somewhat cooled, and caustic soda (either solid or a 50% solution) is added thereto, the result is a rigid gel produced at a final sodium hydroxide concentration as low as 4 normal and with as little as 0.1% amylose based on the total volume of the gel.

Most commercial corn and potato amyloses, as well as the various high-amylose starches, are only partially soluble in boiling water. It is therefore preferable to first dissolve the amylose in a dilute aqueous sodium hydroxide solution below about 4 normal and preferably between about 0.5 and about 2.0 normal. This solubilization can be effected by prolonged stirring in the dilute alkali at room temperature. As an alternative method, relatively insoluble amylose or high-amylose starch may be solubilized in water by pressure-cooking to a temperature of approximately 150° C. This super-heating operation may be achieved batchwise in an autoclave, or continuously in a steam jet cooker. Upon dissolution of the amylose, which is indicated by transparency and absence of any grainy appearance, solid caustic soda or a highly concentrated solution thereof is added to raise the sodium hydroxide concentration to a final concentration in the range of about 4 to about 9 normal. If the system is maintained at room temperature, congelation will generally occur within several minutes. However, if the concentration of sodium hydroxide and/or of amylose are at minimal levels, congelation may require as much as 24 hours. Frequently the addition of solid or high concentration solutions of caustic soda will cause heating. In such a case, congelation generally does not occur until the temperature of the mixture cools to approximately room temperature.

A still different technique may be used to effect solution of the amylose directly in concentrated aqueous sodium hydroxide solutions of about 4 to about 9 normal. At room temperature, amylose is not soluble in aqueous sodium hydroxide solutions of these higher concentrations. However, solution can be effected by first suspending the amylose in an aqueous sodium hydroxide solution of about 4 to about 9 normal, and heating the resulting mixture to elevated temperature. Temperatures from about 65° C. to boiling temperature are required to effect solubilization of the amylose, which is judged by a clear appearance of the solution and the absence of graininess. On cooling the hot solution, congelation will occur. Further details of this mode of gel formation are provided in the examples.

The percent amylose in the examples below is calculated on a dry weight per volume basis.

*Example I*

This example employed a high purity amylose prepared by re-crystallization of potato amylose with butyl alcohol. The iodine affinity of the amylose material was 20.2%, as determined by the standard titration method described in "Methods in Enzymology," edited by Colowick and Kaplan, Academic Press, 1957, volume 3, pages 13–15. The amylose was dissolved in hot water, the resulting solution cooled, and concentrated 10 normal sodium hydroxide added to give the final concentrations of amylose and sodium hydroxide specified below:

| Amylose | NaOH Normality | Congelation Behavior |
| --- | --- | --- |
| 0.15% | 4.0 | Clear rigid gel after 24 hours. |
| 0.12% | 5.0 | Clear rigid gel immediately. |
| 0.10% | 5.0 | Clear rigid gel after 20 minutes. |

*Example II*

Potato amylose having an iodine affinity of 19.3% was dissolved in cold 1 normal sodium hydroxide. Concentrated sodium hydroxide was then added to give the final concentrations of amylose and sodium hydroxide specified below:

| Amylose | NaOH Normality | Congelation Behavior |
| --- | --- | --- |
| 0.5% | 2.1 | Fluid after 24 hours. |
|  | 3.1 | Do. |
|  | 4.1 | Rigid gel in one hour. |
|  | 5.1 | Rigid gel immediately. |
|  | 8.1 | Do. |
| 1.0% | 2.2 | Fluid after 24 hours. |
|  | 3.2 | Do. |
|  | 4.2 | Rigid gel in one hour. |
|  | 5.2 | Rigid gel immediately. |
|  | 8.2 | Do. |

*Example III*

Example II was repeated with the exception of the use of corn amylose prepared in accordance with U.S. Patent No. 3,067,067 and having an iodine affinity of 14.8%. The final concentrations of amylose and sodium hydroxide are shown below:

| Corn Amylose | NaOH Normality | Congelation Behavior |
| --- | --- | --- |
| 0.1% | 3.2 | Fluid after 24 hours. |
|  | 4.2 | Do. |
|  | 5.2 | Do. |
|  | 8.2 | Do. |
| 0.5% | 3.1 | Do. |
|  | 4.1 | Rigid gel after 24 hours. |
|  | 5.1 | Rigid gel immediately. |
|  | 8.1 | Do. |

Example IV

Corn starch was pasted in boiling water, after which the paste was cooled to room temperature and sufficient sodium hydroxide was added to give an alkali concentration of 1 normal. This mixture was stirred until the starch substance was completely dissolved. Concentrated sodium hydroxide was then added to give the concentrations of total starch and sodium hydroxide specified below:

| Starch | NaOH Normality | Congelation Behavior |
|---|---|---|
| 1.0% | 3.2 | Fluid after 24 hours. |
|  | 4.2 | Semi-fluid gel after 24 hours. |
|  | 5.2 | Do. |
|  | 8.2 | Do. |

It will be noted from the above that amylopectin, present in corn starch, interferes with the formation of a rigid gel, in spite of the presence of sufficiently high percentage of amylose.

Example V

Potato amylose having an iodine affinity of 19.3% was used in a procedure essentially the same as Example II, except as shown below. The alkaline materials used were potassium hydroxide and lithium hydroxide in place of sodium hydroxide.

| Alkali | Alkali Normality | Percent Amylose | Congelation Behavior |
|---|---|---|---|
| KOH | 2.8 | 0.5 | Fluid after 24 hours. |
|  | 3.7 | 0.5 | Do. |
|  | 4.5 | 0.5 | Do. |
|  | 7.1 | 0.5 | Do. |
|  | 8.7 | 5.0 | Mushy paste, no congelation after 24 hours. |
| LiOH | 2.6 | 0.5 | Fluid after 24 hours. |
|  | 3.6 | 0.5 | Do. |
|  | 4.1 | 0.5 | Do. |
|  | 4.5 | 0.5 | Do. |
|  | 4.9 | 1.0 | Do. |

It will be noted from the above that no satisfactory gel could be obtained using either lithium or potassium hydroxide, even though high amylose contents and high alkali normality were employed.

Example VI

The indicated amount of potato amylose, having an iodine affinity of 19.3%, was suspended in concentrated sodium hydroxide solution of the specified normality. The mixture was heated to the indicated temperature, and then allowed to cool.

| Amylose | Normality of NaOH | Temperature, °C | Solubility of amylose | Congelation Behavior |
|---|---|---|---|---|
| 0.5% | 5 | About 65 | Dissolved | Clear rigid gel. |
|  | 9 | About 115 | do | Do. |
|  | 10 | 116–118 | Insoluble | No gel. |
|  | 12 | 116–118 | do | Do. |
| 5.0% | 5 | About 65 | Dissolved | Rigid gel. |
|  | 10 | Above 116–118 | Insoluble | No gel. |
|  | 15 | Above 120 | do | Do. |

It will be noted from this example that amylose does not dissolve in a sodium hydroxide solution, above about 9 normal, even at an elevated boiling temperature. Hence no gel can be formed with a sodium hydroxide solution of 10 normal or higher concentration.

Although the invention has been described by reference to certain specific embodiments thereof, it is understood that such embodiments are purely illustrative and for the purpose of clarifying the invention. The invention is in no sense to be limited thereto. Numerous modifications and equivalents of the present invention will be apparent from the foregoing description and operating examples.

The following claims particularly point out and distinctly claim the subject matter of the invention.

I claim:

1. A process for the preparation of a thermally reversible rigid sodium hydroxide gel which comprises dissolving amylose in water having a temperature of at least about 65° C., adding sodium hydroxide in concentrated form, and cooling the resulting mixture to a temperature sufficient to effect congelation, the proportion of amylose being sufficient to provide at least about 0.1% amylose on a dry weight per volume basis of the final composition, and the proportion of sodium hydroxide being sufficient to provide a final concentration of sodium hydroxide between about 4 and about 9 normal.

2. A process according to claim 1 wherein said amylose is corn amylose.

3. A process according to claim 1 wherein said amylose is potato amylose.

4. A process for the preparation of a thermally reversible rigid sodium hydroxide gel which comprises dissolving amylose in a dilute aqueous sodium hydroxide solution having a normality less than 4, and adding sodium hydroxide in concentrated form, the proportion of amylose being sufficient to provide at least about 0.1% amylose on a dry weight per volume basis of the final composition, and the proportion of sodium hydroxide being sufficient to provide a final concentration of sodium hydroxide between about 4 and about 9 normal.

5. A process for the preparation of a thermally reversible rigid sodium hydroxide gel which comprises suspending amylose in a concentrated aqueous sodium hydroxide solution between about 4 and about 9 normal, heating said mixture to a temperature of at least about 65° C. to substantially completely dissolve the amylose, and cooling the resulting mixture to a temperature sufficient to effect congelation, the proportion of said amylose being at least about 0.1% on a dry weight per volume basis of the final composition.

6. An aqueous thermally reversible rigid sodium hydroxide gel consisting essentially of aqueous sodium hydroxide at a concentration of between about 4 and about 9 normal and amylose as a gelling agent at a concentration of at least about 0.1% on a dry weight per volume basis.

References Cited by the Examiner
UNITED STATES PATENTS

| 1,257,307 | 2/1918 | Bloede | 106—213 |
| 2,608,723 | 9/1952 | Wolff et al. | 106—213 X |
| 3,030,667 | 4/1962 | Kunz | 106—213 X |

ALBERT T. MEYERS, *Primary Examiner.*

JULIUS GREENWALD, *Examiner.*

R. D. LOVERING, *Assistant Examiner.*